United States Patent
Diener et al.

(10) Patent No.: US 11,438,348 B2
(45) Date of Patent: Sep. 6, 2022

(54) EFFICIENT DETERMINATION OF EXPECTED MAXIMUM FOR ANOMALY DETECTION

(71) Applicant: INTERSET SOFTWARE INC., Santa Clara, CA (US)

(72) Inventors: Ross Diener, Ottawa (CA); Shaun Pilkington, Ottawa (CA); Maria Pospelova, Ottawa (CA)

(73) Assignee: Interset Software, Inc., Santa Clara, CA (US)

( * ) Notice: Subject to any disclaimer, the term of this patent is extended or adjusted under 35 U.S.C. 154(b) by 240 days.

(21) Appl. No.: 16/833,302

(22) Filed: Mar. 27, 2020

(65) Prior Publication Data

US 2021/0306353 A1    Sep. 30, 2021

(51) Int. Cl.
*G06N 5/04* (2006.01)
*H04L 9/40* (2022.01)
*G06N 20/00* (2019.01)
*G06F 21/55* (2013.01)

(52) U.S. Cl.
CPC ........ *H04L 63/1416* (2013.01); *G06F 21/552* (2013.01); *G06N 5/045* (2013.01); *G06N 20/00* (2019.01); *G06F 21/554* (2013.01)

(58) Field of Classification Search
CPC . H04L 63/1416; G06F 21/552; G06F 21/554; G06N 5/045; G06N 20/00
See application file for complete search history.

(56) References Cited

U.S. PATENT DOCUMENTS

| | | | |
|---|---|---|---|
| 7,937,351 B2 | 5/2011 | Milenova et al. | |
| 8,438,126 B2 | 5/2013 | van der Laan | |
| 10,504,026 B2 * | 12/2019 | Maheshwari | .......... G06N 5/045 |
| 2018/0089587 A1 | 3/2018 | Suresh et al. | |
| 2021/0126836 A1 * | 4/2021 | Patel | .................... H04L 41/147 |

FOREIGN PATENT DOCUMENTS

KR    20110112502 A    * 10/2011

OTHER PUBLICATIONS

Van Hasselt, Hado. "Estimating the maximum expected value: an analysis of (nested) cross validation and the maximum sample average." Obtained online from <https://arxiv.org/abs/1302.7175>, retrieved on Apr. 9, 2022 (Year: 2013).*

(Continued)

*Primary Examiner* — Jeffery L Williams
*Assistant Examiner* — Zhimei Zhu

(57) ABSTRACT

An apparatus may include a processor that may be caused to access a distribution of a plurality of values, each value of the plurality of values quantifying an event of an event type in a computer network. The processor may determine a mean of the plurality of values and a second highest value of the plurality of values, generate an expected maximum of the distribution based on the mean and the second highest value, and access a first value quantifying a first event of the event type in the computer network. The processor may further determine that the first event is an anomalous event based on the first value and the expected maximum.

20 Claims, 5 Drawing Sheets

(56) References Cited

OTHER PUBLICATIONS

D'Eramo et al., "Estimating the Maximum Expected Value in Continuous Reinforcement Learning Problems", Proceedings of the Thirty-First AAAI Conference on Artificial Intelligence (AAAI-17), 2017, pp. 1840-1846.

Nguyen et al., "Active Testing: An Efficient and Robust Framework for Estimating Accuracy", Proceedings of the 35th International Conference on Machine Learning, Stockholm, Sweden, PMLR 80, Jul. 2, 2018, 10 pages.

Park et al., "BlinkML: Efficient Maximum Likelihood Estimation with Probabilistic Guarantees", SIGMOD '19, Jun. 30-Jul. 5, 2019, 22 pages.

* cited by examiner

212A

212B

212N

MACHINE-READABLE MEDIUM
500

ACCESS A DISTRIBUTION OF A PLURALITY OF VALUES, EACH VALUE OF THE PLURALITY OF VALUES QUANTIFYING AN EVENT IN A COMPUTER NETWORK
502

DETERMINE AN ERROR ASSOCIATED WITH THE DISTRIBUTION
504

COMPARE THE ERROR TO A THRESHOLD ERROR VALUE
506

RESPONSIVE TO A DETERMINATION THAT THE ERROR DOES NOT EXCEED THE THRESHOLD ERROR VALUE, GENERATE AN EXPECTED MAXIMUM BASED ON A MEAN OF THE PLURALITY OF VALUES AND A SECOND HIGHEST VALUE IN THE PLURALITY OF VALUES
508

DETECT AN ANOMALOUS EVENT IN THE COMPUTER NETWORK BASED ON THE EXPECTED MAXIMUM
510

*FIG. 5*

EFFICIENT DETERMINATION OF EXPECTED MAXIMUM FOR ANOMALY DETECTION

BACKGROUND

An expected maximum may refer to a maximum value in a distribution that is considered non-anomalous. If a value exceeds the expected maximum, then the value may be considered anomalous relative to the distribution.

BRIEF DESCRIPTION OF THE DRAWINGS

Features of the present disclosure may be illustrated by way of example and not limited in the following figure(s), in which like numerals indicate like elements, in which:

FIG. 5 depicts a block diagram of an example non-transitory machine-readable storage medium of assessing a distribution of values to determine an expected maximum for anomaly detection.

DETAILED DESCRIPTION

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as to not unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Disclosed herein are improved apparatuses, methods, and machine-readable media that may efficiently detect anomalous events based on efficient determination of an expected maximum in a distribution of values. Estimating the expected maximum may be useful in many applications. For example, in anomaly detection systems, anomalies often appear as a single observation that exceeds some expected maximum threshold based on other sample data.

Computing such a threshold via algorithm may be difficult in general and require complex algorithms because its location in the distribution may be highly sensitive to the underlying distribution, which might not be known in advance. For example, it may be unknown in advance whether the distribution exhibits heavy tails (where a tail or last portion of the distribution is outside the norm of values), uniform distribution, or other characteristic that may impact calculation of the expected maximum. The disclosure herein facilitates efficient anomaly benchmarking and detection.

For example, various computer systems may be improved to efficiently identify an expected maximum in a distribution of values. Examples of anomaly detection used herein throughout may include an information security system that may use the expected maximum as a threshold value for identifying anomalous events in a computer system. In these examples, the anomalous event may represent a potential security intrusion and/or other network security event. Other anomalous detection systems may be similarly improved to detect anomalies in other domains as well. For example, anomaly detection systems may be improved in various other domains such as fraud detection, systems and reliability engineering, health and safety, and/or other domains in which an expected maximum may be used as a threshold value for detecting anomalies. Estimating the expected maximum may also be used to remove outliers and enrich a dataset for more general machine learning purposes.

Figure 1:
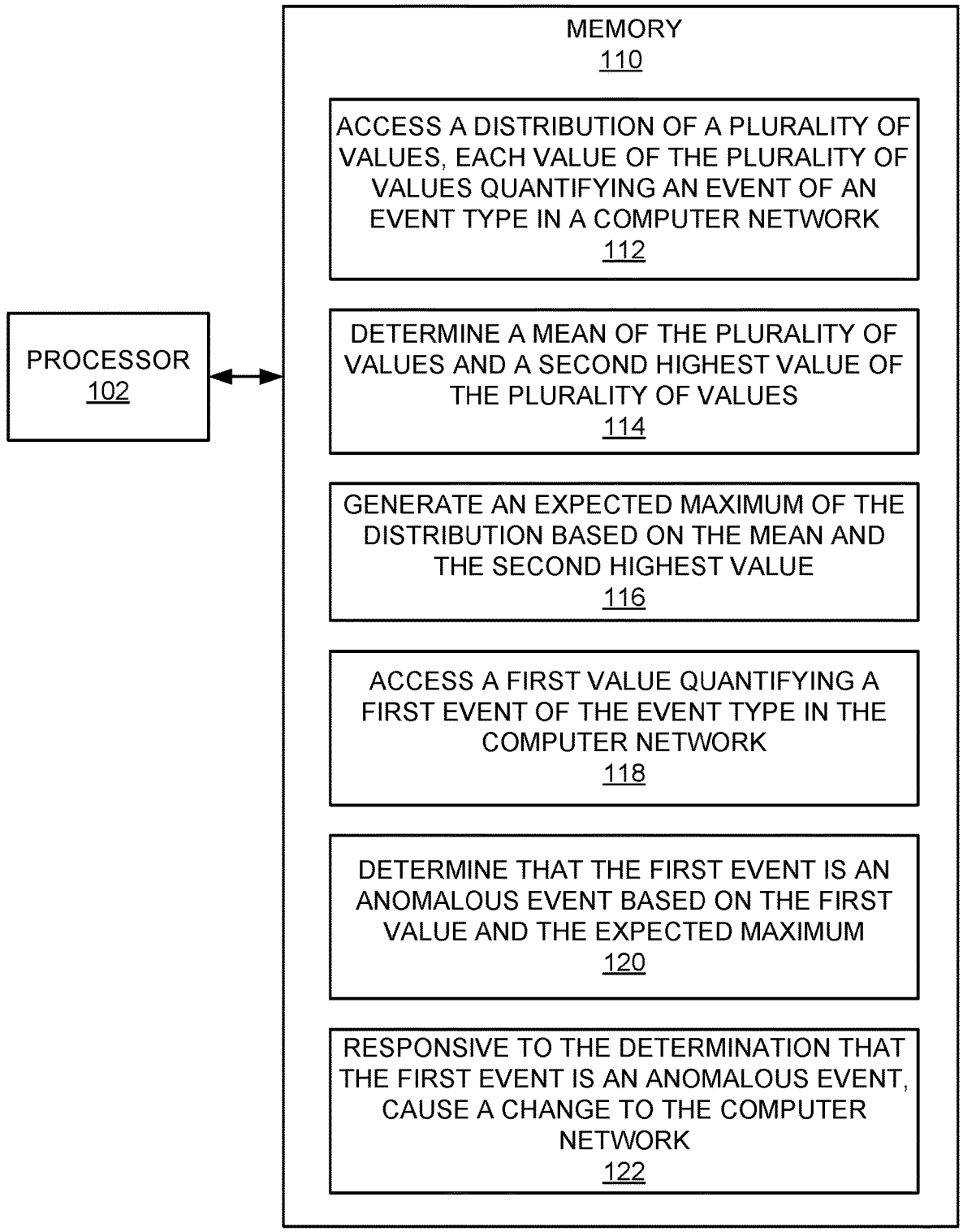
FIG. 1 depicts a block diagram of an example apparatus that detects anomalies in a system based on efficient determination of an expected maximum from a distribution of values in the system.

FIG. 1 depicts a block diagram of an example apparatus 100 that detects anomalies in a system based on efficient determination of an expected maximum from a distribution of values in the system. The apparatus 100 shown in FIG. 1 may be a computing device, a server, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scope of the apparatus 100 disclosed herein.

The apparatus 100 may include a memory 110 that may have stored thereon machine-readable instructions (which may also be termed computer readable instructions) 112-122 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. It should be understood that the example apparatus 100 depicted in FIG. 1 may include additional features and that some of the features described herein may be removed and/or modified without departing from the scope of the example apparatus 100.

The processor 102 may fetch, decode, and execute the instructions 112 to access a distribution of a plurality of values, each value of the plurality of values quantifying an event of an event type in a computer network. The processor 102 may fetch, decode, and execute the instructions 114 to determine a mean of the plurality of values and a second highest value of the plurality of values.

The processor 102 may fetch, decode, and execute the instructions 116 to generate an expected maximum of the distribution based on the mean and the second highest value. In some examples, to generate the expected maximum, the processor may sum the mean and the second highest value. In some examples, the distribution of the plurality of values is specific to a particular user and the expected maximum is applied only to the particular user. For example, the distribution of a plurality of values may relate to a historic number of login attempts by a particular user and the expected maximum may be applied for the particular user. In some examples, the distribution of the plurality of values relates to a plurality of users and the expected maximum is applied any user among the plurality of users. In these examples, the distribution of a plurality of values may relate to a historic number of login attempts by the plurality of users (such as a grouping of users or all users in an organization) and the expected maximum may be applied for the plurality of users.

Figure 2:
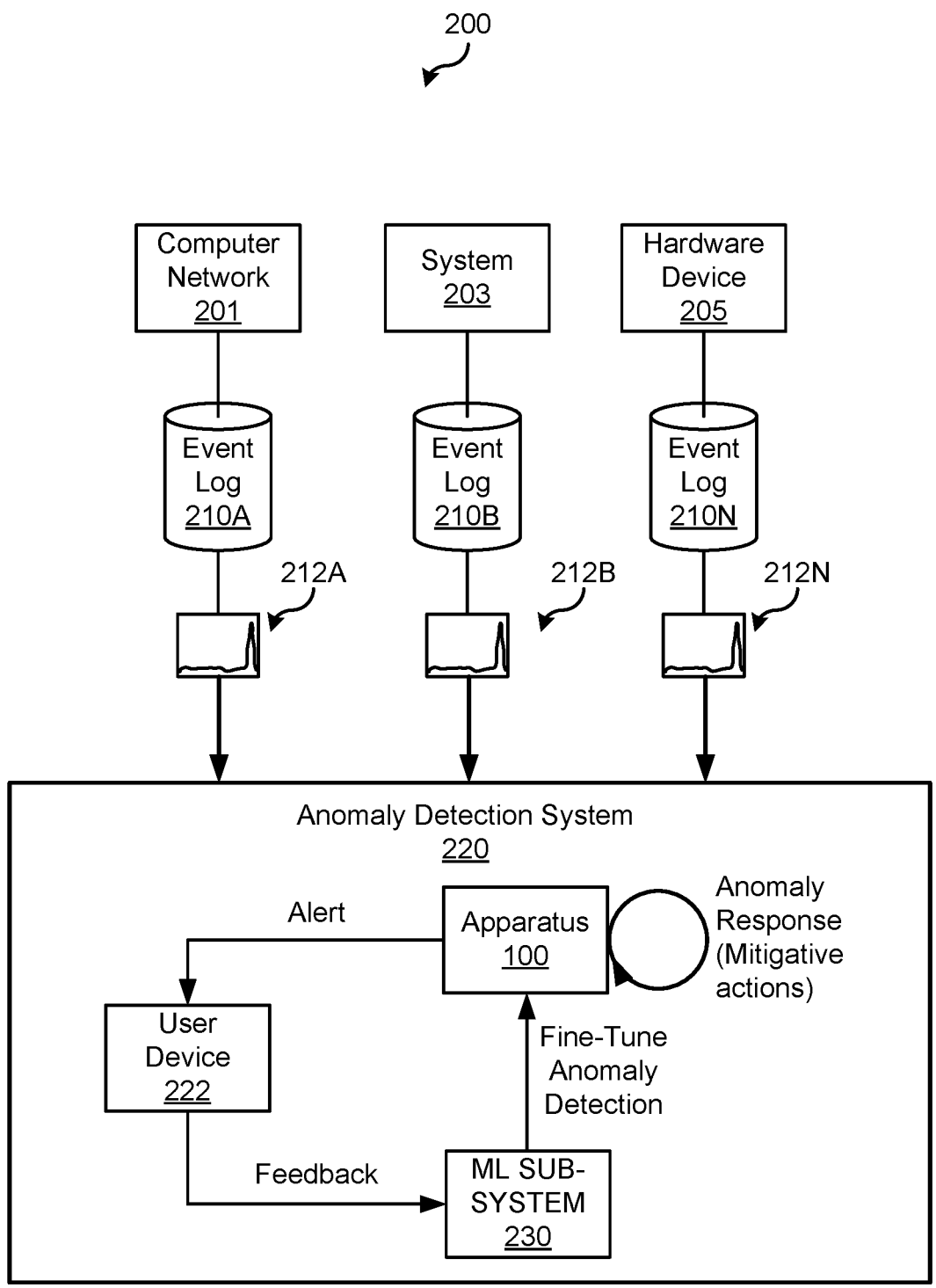
FIG. 2 depicts an example an anomaly detection system that includes the apparatus depicted in FIG. 1.

The processor 102 may fetch, decode, and execute the instructions 118 to access a first value quantifying a first event of the event type in the computer network, such as the computer network 201 illustrated in FIG. 2. To illustrate, the event type may include a login event and the first value may include a number of login attempts, within a predefined amount of time, to access the computer network 201 using a user account. In this example, the distribution of values may include previously observed numbers of number of login attempts in the predefined amount of time. For example, there may be a larger number of login attempts early in the morning when users arrive for work versus login attempts late at night. Thus, the mean of the distribution may indicate an average number of login attempts within the predefined amount of time.

The processor 102 may fetch, decode, and execute the instructions 120 to determine that the first event is an anomalous event based on the first value and the expected maximum. Continuing the foregoing example, whenever a number of login attempts exceed the expected maximum of the distribution, then an anomalous network event may be detected (in this example, a potential security intrusion). Thus, the processor 102 may determine that the login attempt is anomalous when the number of login attempts exceed the expected maximum.

The processor 102 may fetch, decode, and execute the instructions 122 to, in response to the determination that the first event is an anomalous event, cause a change to occur in the computer network. In some examples, the change may include a the taking of a mitigative action, such as generate and transmit an alert indicating the anomaly, make an active response such as suspending the user account, and/or other mitigative actions described with respect to FIG. 2.

In some examples, the processor 102 may periodically re-assess the distribution of values as new values are available. For example, the processor may further access a new distribution of a new plurality of values, each new value of the new plurality of values quantifying the event of the event type in the computer network, determine a new mean of the new plurality of values and a new second highest value of the new plurality of values, and generate a new expected maximum of the new distribution based on the new mean and the new second highest value. In some example, the processor 102 may assess whether or not the new expected maximum should be used. For example, the processor 102 may determine that the new expected maximum is invalid, and disregard the new expected maximum. For example, the processor 102 may determine an error associated with the new expected maximum, compare the error to a threshold error value, and determine that the new expected maximum is invalid based on the comparison.

For example, if the distribution of values is highly variable or there are otherwise low-quality data, this should be reflected in an error for the confidence interval (precision) associated with the expected maximum. In some examples, such error may be determined based on a standard deviation of the underlying dataset. The error may be compared to a threshold error value to determine whether the expected maximum may be suitably estimated based on the mean and the second highest value. In particular, if the standard deviation exceeds a threshold standard deviation, then the mean and second highest value estimation for the expected maximum may be deemed unsuitable for the distribution of values. In some examples, such error may be determined based on a difference between the actual maximum and second highest value in the dataset. If the difference is greater than a threshold difference, then the mean and second highest value estimation for the expected maximum may be deemed unsuitable for the distribution of values. In these examples, the expected maximum is determined based on the mean and the second highest value may be disregarded and/or another expected maximum determination may be made based on a second technique other than the mean and the second highest value estimation for the expected maximum.

In some examples, the processor 102 may adjust the expected maximum. For example, the processor 102 may access information indicating whether or not the first event was correctly determined to be an anomalous event, and adjust expected maximum based on the accessed information. To the extent that the information indicating that the first event was not anomalous, for example, the processor 102 may adjust the expected maximum upward. On the other hand, to the extent that the information indicating that the first event was anomalous and the expected maximum was too high, the processor 102 may adjust the expected maximum downward.

In some examples, to adjust the expected maximum, the processor 102 may apply a machine-learning model based on the information indicating whether or not the first event was correctly determined to be an anomalous event, and adjust the expected maximum up or down based on the machine-learning model. The information may be provided by a user. For example, the information indicating whether or not the first event was correctly determined to be an anomalous event may be used as user-annotated, labeled, training data for training a machine-learning model.

In some examples, the information may indicate that the mean of the distribution is to be adjusted upward or downward. In these examples, the processor 102 may correlate the mean in the distribution to the information indicating whether or not the first event was correctly determined to be an anomalous event, and apply a weight to the mean to adjust the expected maximum.

In some examples, the information may indicate that the mean of the distribution is to be adjusted upward or downward. In these examples, the processor 102 may correlate an observed second highest value in the distribution to actual detected outcomes, and apply a weight to the second highest value to adjust the expected maximum.

FIG. 2 depicts an example an anomaly detection system 220 that includes the apparatus depicted in FIG. 1. The anomaly detection system 220 may detect anomalies from various types of systems, such as a computer network 201, a system 203, a hardware device 205, and/or other systems. Each of the computer network 201, a system 203, a hardware device 205, and/or other systems may be associated with values that may be stored in a respective event log 210A-N. The values may be indicative of operation or health of the respective system. From these values in the event logs 210A-N, a respective distribution of values 212A-N may be generated.

The anomaly detection system 220 may access one or more of the distribution of values 212A-N and detect anomalies in a respective system. For example, in the context of a computer network 201, the values may relate to network events such as account logins, number of requests from a particular IP address, number of Domain Name System (DNS) messages, or other type of events (e.g., backup events, network maintenance events, and/or the like). The anomalies may relate to a potential security intrusion, a misconfigured network device, and/or other anomaly that may indicate a current or future abnormal operating condition of the computer network 201. In the context of a system 203, the values may relate to various biological or other systems. Such biological systems may include sensor readings of biometric data (where an event may include a biological condition such as a heartrate measurement) or other types of events, an abnormality of which may indicate a health condition. In some examples, the system 203 may be implemented in a factory setting in which estimating expected maximum number of defective products in a factory may be detected. The mitigative action may include suspending the production line and/or taking other mitigative actions. If the defect count exceeds the expected maximum, then a machine in the factory may be identified for repair or replacement. In some examples, the system 203 may be implemented in civil engineering systems such as in a levee monitoring system that may determine an expected maximum water level from historical data. If a levee is not tall enough for the expected maximum water level, then the levee may be refit to prevent flooding. In the context of a hardware device 205, the values may relate to operating measurements of the device and any anomalous values beyond an observed distribution of values may indicate abnormal use of the hardware device 205.

To detect anomalies, the apparatus 100 may determine an expected maximum in a distribution of values. The expected maximum may be based on the mean of the distribution of values and the second highest value in the distribution of values. Various examples of anomaly detection system 220 has been (such as through login detection) or will be described in the context of improving anomaly detection in a computer network 201 to detect potential security intrusion and/or other anomalous network events. Furthermore, the anomaly detection system 220 may include a response sub-system (not illustrated) that may cause a mitigative action to occur in the computer network 201. However, as previously noted, the apparatus 100 may be implemented in other types of anomaly detection systems and response sub-systems.

In some examples, the anomaly detection system 220 may be implemented to detect that a client device (not illustrated) in the computer network 201 has been infected with malware. For example, the malware may attempt to contact a malicious server (such as to forward maliciously obtained data from the client device, receive further malware to execute on the client device, and so forth). To do so, the malware may transmit, to a DNS server, DNS messages each having an algorithmically-generated domain name and each requesting a mapping to an Internet Protocol (IP) address. Many of the algorithmically-generated domain names may not resolve to valid Internet Protocol (IP) addresses, but one or more of these algorithmically-generated domain names may resolve to the IP address of a malicious server.

The malware may use such algorithmically-generated domain names to avoid detection from security systems of the computer network 201 that use domain name blacklists or other malicious domain name detection. One issue for the security systems may include an inability to distinguish between normal and anomalous numbers of DNS messages from a given client device or group of client devices.

Various examples of the apparatus 100 may determine whether DNS messages from a given client device or group of client devices (client device(s)) result from malware-derived algorithmically generated domain names. In these examples, the type of event may include a DNS message, the event log 210A may include a DNS message log that stores DNS messages, including an identity of the client device that submitted such DNS messages, and the anomaly may include an abnormally high number of DNS messages from the client device(s). For example, the apparatus 100 may access a distribution of DNS messages, determine an expected maximum for a number of DNS messages, and compare a number of DNS messages from the client device(s) to the expected maximum. In this manner, an example of the apparatus 100 may include a malicious DNS message detection system and correspondingly malware-infected client device detection.

In this example, the response sub-system may suspend DNS message access from the client device(s). For example, the apparatus 100 may identify the client device(s) determined to be infected with malware. The apparatus 100 may cause a mitigative action to occur with respect to the client device(s). For example, the apparatus 100 may provide an alert to a user device 222. The alert may indicate the detected anomaly, such as to alert an IT administrator that the client device(s) may have been infected with malware. In some examples, the IT administrator may provide feedback for machine-learning, as will be described further with respect to the Machine Learning sub-system 230. In some examples, the mitigative action may include automatically blocking the client device(s) from submitting DNS messages. Other types of mitigative actions may be taken as well, such as transmitting an alert to the client device(s) that they may be infected with malware, transmitting anti-virus patches to the client device(s), and the like.

In some examples, the anomaly detection system 220 may be implemented to detect data dumping on ports, denial of service attacks, and/or others in which an abnormal amount of data or number of Hyper Text Transfer Protocol or other requests are maliciously transmitted to the computer system 201. For example, malware executing on the client device(s) or device operated by a malicious actor may employ port scanning or port sweeping to identify ports that may be vulnerable to a particular attack. In a particular example, the malware may target ports that host an application service that may be vulnerable to an attack. Upon identifying such a port, the malware may transmit a series of requests to the identified port to exploit vulnerabilities in the application service and/or identified port. In some examples, a given port or application service may receive an anomalous amount of data, requests, and/or other transmissions to one or more ports of a server of the computer network 201 during a denial of service (DOS) attack that attempts to overload the computer network 201 with requests so that the computer network 201 is unable to process legitimate requests.

Various examples of the apparatus 100 may determine whether ports are being targeted for such data dumping, whether the computer network 201 is under a DOS attack, and/or is the subject of other anomalous events. In these examples, the type of event may include port scanning or sweeping, data transmission to one or more ports, HTTP requests targeted to an application service, and/or others events. The event log 210A may include a log of port scan or sweep events (in which ports may be sequentially pinged), a log of HTTP requests and the anomaly may include an abnormally high number of port scans or sweeps or HTTP requests. For example, the apparatus 100 may access a distribution of port scans or sweeps, determine an expected maximum for a number of scans or sweeps, and compare the number of port scans or sweeps to the expected maximum. Alternatively, or additionally, the apparatus 100 may access a distribution of a number or amount of data dumps targeted to a particular port, determine an expected maximum for the number or amount of data dumps, and compare the number or amount of data dumps targeted to a particular port to the expected maximum. In this manner, an example of the apparatus 100 may include a malicious port targeting detection system. Similarly, the apparatus 100 may access a distribution of a number of HTTP (or other type of) requests targeted to the computer network 201 (such as targeted to an application service hosted by a server in the computer network 201), determine an expected maximum for the number of HTTP requests, and compare the number of HTTP requests to the expected maximum. In this manner, an example of the apparatus 100 may include a DOS detection system.

In the foregoing examples, the response sub-system may cause a mitigative action by suspending access to the port (by shutting down the port) or suspending access to the port from offending devices that may have conducted the port scan or sweep or transmitted data dumps to the port. Likewise, the response sub-system may cause a mitigative action by re-routing HTTP requests to a scrubbing system that may filter out known sources for DOS attacks so that filtered requests may be legitimately processed. In any example, the mitigative action may include transmitting an alert to appropriate personnel of the computer network 201 so that further mitigative action may be undertaken.

Other types of mitigative actions may be taken as well, depending on the anomaly and type of system for which the anomaly is detected. For example, mitigative actions on a physical system may include causing a change to the physical system. As used herein, the term physical system may refer to a system having physical, such as hardware, components that can be changed in response to a detected anomaly. Such changes may include a reconfiguration (such as a reconfiguration of ports in a computer system), change in an assembly line (such as in a factory system), change in a diagnostic sensor or dosage system (such as in a biological system), and/or other types of changes to physical systems.

In some examples, a user may provide feedback to a Machine Learning (ML) sub-system 230. The ML-subsystem 230 may train (via supervised and/or semi-supervised training) a machine-learning model to determine a weight for the expected maximum. The weight may increase or decrease the expected maximum calculation for the computer network 201, the system 203, and/or the hardware device 205. In some examples, the mean and/or second highest value of a distribution of values may be weighted to weight the expected maximum.

In some examples, the information may indicate that the mean of the distribution is to be adjusted upward or downward. In these examples, the processor 102 may correlate the mean in the distribution to the information indicating whether or not the first event was correctly determined to be an anomalous event, and apply a weight to the mean to adjust the expected maximum. For example, a user may indicate that, for a given distribution of values, the expected maximum should be adjusted upward or downward based on adjusting upward or downward the value of the mean and/or the importance of the mean (relative to the second highest value) in the expected maximum determination. Such indication may be used as labeled feature data for the distribution of values for training the machine-learning model, which may result in fine-tuning the expected maximum estimate by revising upward or downward the mean and/or weighting the importance of the mean.

In some examples, the information may indicate that the mean of the distribution is to be adjusted upward or downward. In these examples, the processor 102 may correlate observed second highest value in the distribution to actual detected outcomes, and apply a weight to the second highest value to adjust the expected maximum. For example, a user may indicate that, for a given distribution of values, the expected maximum should be adjusted upward or downward based on adjusting upward or downward the value of the second highest value and/or the importance of the second highest value (relative to the mean) in the expected maximum determination. Such indication may be used as labeled feature data for the distribution of values for training the machine-learning model, which may result in fine-tuning the expected maximum estimate by revising upward or downward the second highest value and/or weighting the importance of the second highest value.

Figure 3:
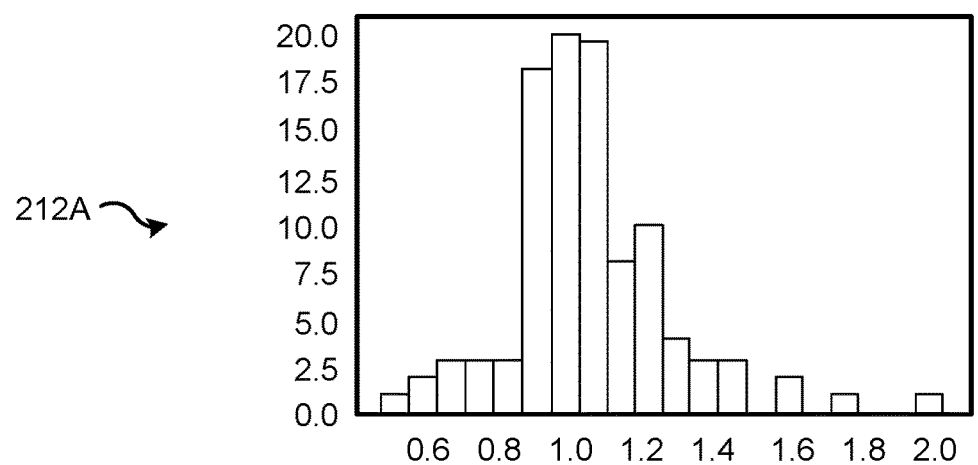
FIG. 3 depicts examples of different distributions of values each of which may be used to determine an expected maximum for anomaly detection.
Figure 3:
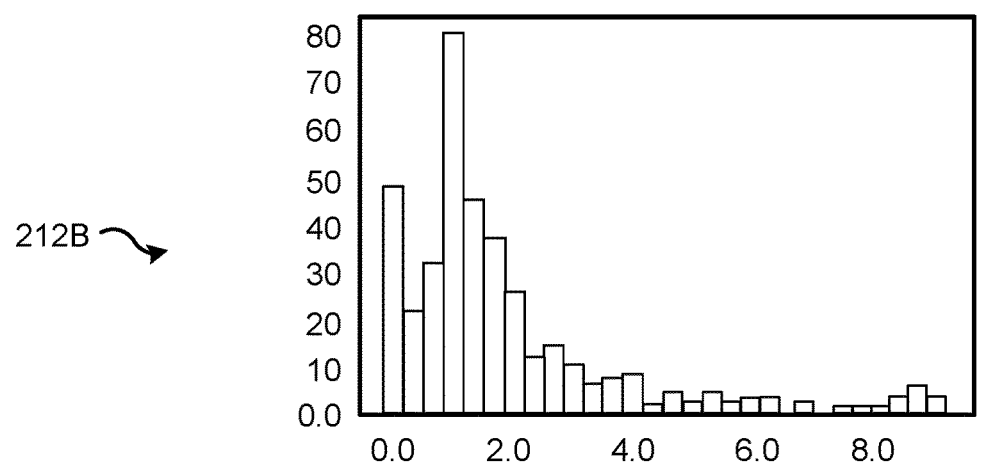
Figure 3:
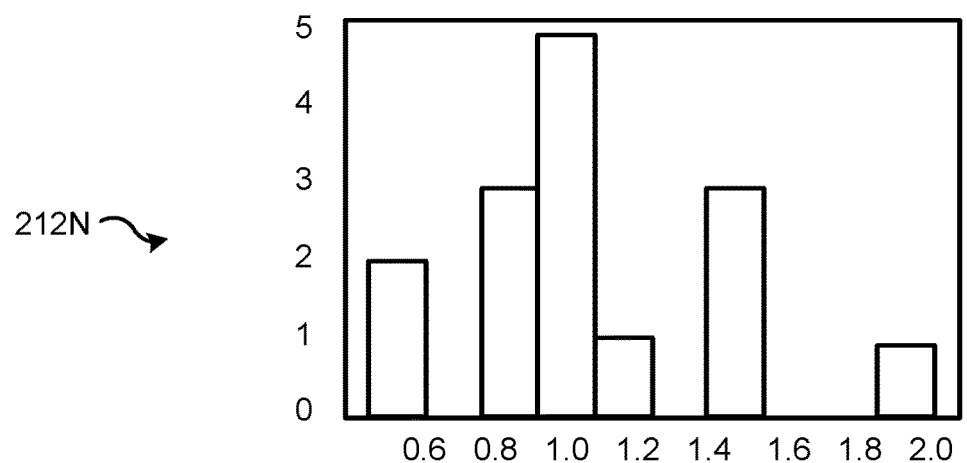

FIG. 3 depicts examples of different distributions of values 212A-N each of which may be used to determine an expected maximum for anomaly detection. For example, anomaly detection may operate on a bell curve-like distribution shown in the distributions of values 212A, a heavy-headed distribution shown in the distributions of values 212B in which values are clustered at the beginning of the distribution, and a sparse or evenly distributed distribution shown in the distributions of values 212N.

Figure 4:
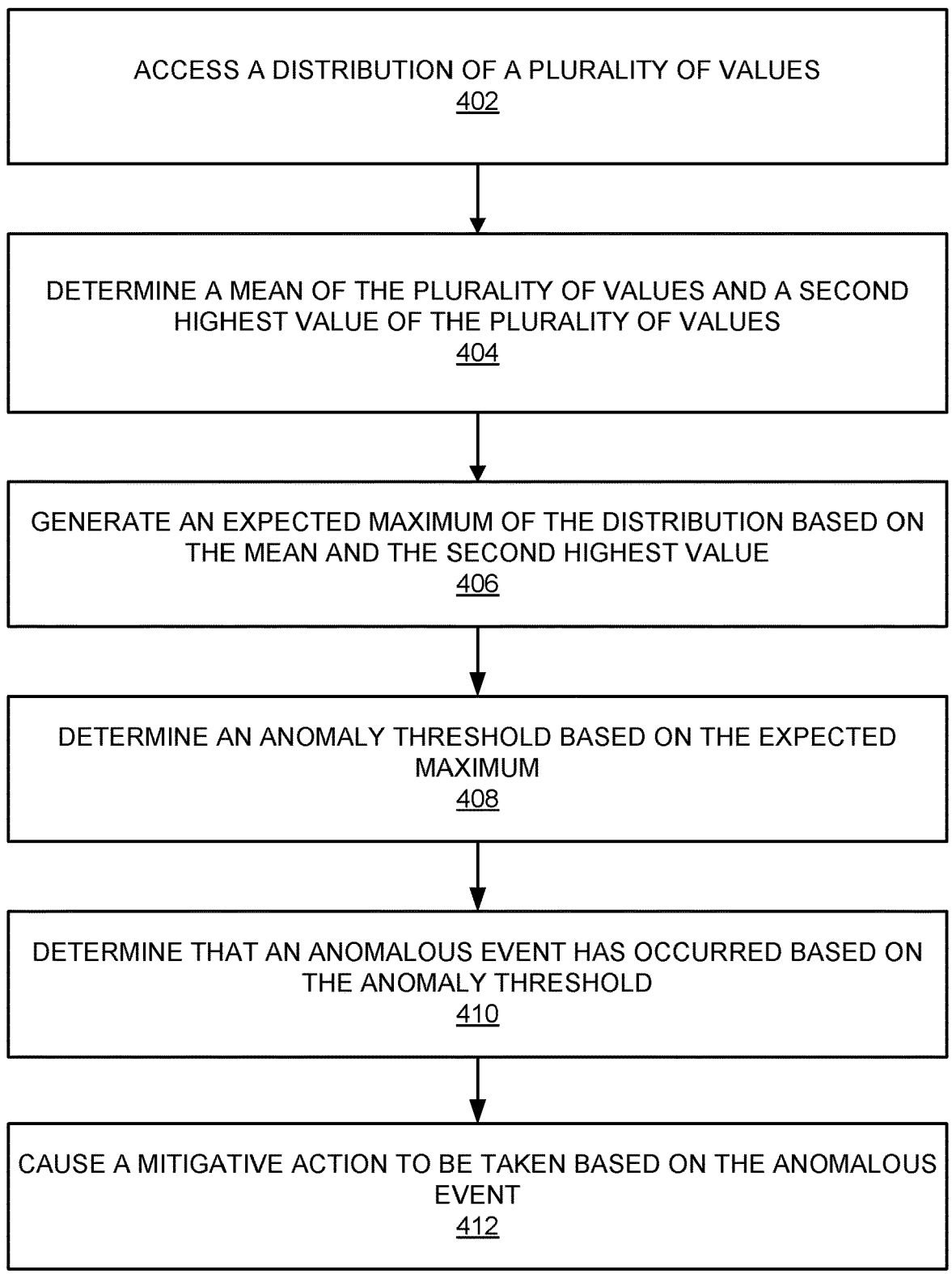
FIG. 4 depicts a flow diagram of an example method of detecting an anomaly in a system.

Various manners in which the apparatus 100 may operate to detect anomalies are discussed in greater detail with respect to the method 400 depicted in FIG. 4. It should be understood that the method 400 may include additional operations and that some of the operations described therein may be removed and/or modified without departing from the scope of the methods. The description of the method 400 may be made with reference to the features depicted in FIGS. 1 and 2 for purposes of illustration.

As previously noted, determining an expected maximum on these and other distributions of values may be difficult and computationally intensive. The following may support the efficient estimation of the expected maximum based on the mean and the second highest value in the distribution of values.

In some examples, a second technique to determine an expected maximum may include implementation of the extreme value theory for understanding the statistics of a random variable's maximum. In the extreme value theory, a new random variable is defined $Y_n = \max(X_1, \ldots, X_n)$ and its cumulative distribution can be computed based on equation (1):

$$F_{Y_n}(y) = P(Y_n \leq y) = P(\max(X_1, \ldots, X_n) \leq y) \tag{1}$$

If y is going to exceed the maximum of $X_1, \ldots, X_n$, it may exceed each of them individually. The probability $P(X_i \leq x)$ is recognized as the cumulative distribution for X, which we write as $F_X(x)$. Substituting this in gives equation (1):

$$F_{Y_n}(y) = [F_X(y)]^n \tag{2}$$

This is the final result that relates the distribution of a maximum $Y_n$ to the underlying distribution of the data X. If $F_X$ is known for every event, then the expected maximum observation may be determined. However, to do so may be computationally expensive. More explicitly, if an underlying distribution for the data, FX, is assumed, then the parameters of the distribution may be related to the expected maximum.

Uniform Distributions

For uniformly distributed X, E[Yn] may be computed in terms of E[X] and n with a simplification in the large n limit. Suppose X is uniformly distributed such that FX (x)=x/a in the range [0,a] and vanishing or unity otherwise. The mean may be E[X]=a/2. This implies that the distributions for Yn are given by equation (3):

$$F_{Y_n}(y) = \left(\frac{y}{a}\right)^n \text{ and } f_{Y_n}(y) = F'_{Y_n}(y) = \frac{ny^{n-1}}{a^n} \quad (3)$$

Based on equation (3), the expected value of Yn may be given by equation (4):

$$E[Y_n] = \int_0^a dy\, y f_{Y_n}(y) = 2\left(\frac{n}{n+1}\right) E[X] \quad (4)$$

E[Yn] may therefore be expressed in terms of E[X] and it simplifies a great deal in the n>>1 limit to give E[Y]=2 E[X].

Exponential Distributions

If X is distributed exponentially:

$$F_X = 1 - e^{-x/\lambda} \text{ and } E[X] = \lambda \quad (5)$$

The expected maximum may be rewritten as follows:

$$E[Y_n] = \lambda(\psi(n+1)+\gamma) = E[X](\psi(n+1)+\gamma) \quad (6)$$

where $\psi$ is the digamma function and $\gamma$ is the Euler-Mascheroni constant. This is logarithmically sensitive to n for large values.

Weibull Distributions

If X follows a Weibull distribution. In this case, the distribution is:

$$F_X = 1 - e^{-k\left(\frac{y}{\lambda}\right)^c} \text{ and } E[X] = \lambda \Gamma(1 + 1/c) \quad (7)$$

The expected maximum may be written as follows:

$$E[Y_n] = -E[X] \sum_{k=1}^n \binom{n}{k}(-1)^k k^{-1/c} \quad (8)$$

Asymptotically, there is actually an expression for that can be derived using a Norlund-Rice integral:

$$E[Y_n] = -E[X]\left(\frac{(\log n)^{1/c}}{\Gamma(\beta+1)}\right) \quad (9)$$

For the Weibull distribution, it is computationally intensive to estimate from data the c and k parameters that are required to find E[Yn]. For more complex distributions, estimating parameters is even more difficult, and it is presumably intractable to calculate the formula for E[Yn]. Unfortunately, a rather general distribution (with many fit parameters) is required to fit the variety of data that arises for these anomalies.

Beyond these inefficiencies, there is a sense in which the sensitivity to n is counter-intuitive. For example, an entity with 30 identical observations would have a lower threshold than an entity with 300 of the same observation. However, an outlying value from an entity with a longer history of consistent behavior is intuitively more anomalous, so this entity having a higher threshold is confusing.

The notion of a probability distribution for the maximum may be generalized to any order second highest, third highest, minimum, and so on. For example, the probability distribution for the second highest Hn may be given by the following expression:

$$f_{H_n}(h) = \frac{n!}{(n-2)!} f_X(h)[F_X(h)]^{n-2}(1 - F_X(h)) \quad (10)$$

Similarly, the joint distribution of order statistics is a textbook result. For the use case of interest, the joint distribution of the maximum and second highest is particularly relevant, as given by equation (11):

$$P(Y_n = y, H_n = h) = \frac{n!}{(n-2)!} f_X(h)[F_X(h)]^{n-2} f_X(y) \quad (11)$$

The observation is that these two quantities remarkably similar. This means that the expression for the probability of the maximum conditioned on the second highest simplifies to the following expression for y>h:

$$P(Y = y \mid H = h) = \frac{f_X(y)}{1 - F_X(h)} \quad (12)$$

Beyond the simplified functional form, the dependence on n may vanish from this expression (so it is removed from the notation). The expected value may be determined based on:

$$E[Y \mid H = h] = \frac{\int_h^\infty dy\, y f_X(y)}{1 - F_X(h)} \quad (13)$$

Equation (13) has two advantageous properties. The first is that it exceeds the observed second highest of X. The second is that it exceeds the mean of X. Both of these advantageous properties are true for distributions that have weight on x>0.

For an exponentially distributed random variable X, the conditional expectation of the maximum can be determined as follows:

$$E[Y \mid H = h] = \frac{\int_h^\infty dy \left(\frac{y}{\lambda}\right) e^{-y/\lambda}}{1 - F_X(h)} = \lambda + h = E[X] + h \quad (14)$$

This may be a surprisingly simple result. Similarly, for a uniform distribution on [0,a] the conditional expectation is given by:

$$E[Y \mid H = h] = \frac{a+h}{2} = E[X] + h/2 \qquad (15)$$

A formula for the expected highest that linearly combines the second highest and mean is well-motivated by the foregoing. Thus, the following expression may simplify an expected maximum determination from a distribution of values:

$$E[Y] = AE[X] + Bh \qquad (16)$$

In order to satisfy the criteria that the expected highest exceed the mean requires $A \geq 1$ and theory motivates the choice $A=1$ so there is only one coefficient to estimated.

FIG. 4 depicts a flow diagram of an example method of detecting an anomaly in a system. At block 402, the method 400 may include accessing, by a processor, a distribution of a plurality of values. At block 404, the method 400 may include determining, by the processor, a mean of the plurality of values and a second highest value of the plurality of values.

At block 406, the method 400 may include generating, by the processor, an expected maximum of the distribution based on the mean and the second highest value. Generating the expected maximum may include summing the mean and the second highest value and using the expected maximum for the anomaly threshold. In some examples, generating the expected maximum may include summing the mean and the second highest value, applying a weight to the expected maximum and using the weighted expected maximum as the anomaly threshold. For example, the expected maximum may be weighted based on prior feedback received from a user. In this example, the expected maximum may be adjusted (such as via the weighting and/or other type of adjustment) based on the feedback.

At block 408, the method 400 may include determining, by the processor, an anomaly threshold based on the expected maximum. At block 410, the method 400 may include determining, by the processor, that an anomalous event has occurred based on the anomaly threshold. In some examples, determining that the anomalous event has occurred may include determining one or more of: determining a potential security event in a computer network, determining an abnormal health condition based on diagnostic test results, predicting a potential component failure, determining potential fraud, or predicting potential traffic congestion. Other types of events may be assessed as being anomalous or not.

At block 412, the method 400 may include causing a mitigative action to occur based on the anomalous event (which may have been determined at 410). Various types of mitigative actions may be performed, such as those discussed with respect to FIG. 2.

Some or all of the operations set forth in the method 400 may be included as utilities, programs, or subprograms, in any desired computer accessible medium. In addition, the method 400 may be embodied by computer programs, which may exist in a variety of forms. For example, some operations of the method 400 may exist as machine-readable instructions, including source code, object code, executable code or other formats. Any of the above may be embodied on a non-transitory machine-readable (such as computer-readable) storage medium. Examples of non-transitory machine-readable storage media include computer system RAM, ROM, EPROM, EEPROM, and magnetic or optical disks or tapes. It is therefore to be understood that any electronic device capable of executing the above-described functions may perform those functions enumerated above.

FIG. 5 depicts a block diagram of an example non-transitory machine-readable storage medium 500 of assessing a distribution of values to determine an expected maximum for anomaly detection. The machine-readable instructions 502 may cause the processor (such as processor 102 illustrated in FIG. 1) to access a distribution of a plurality of values, each value of the plurality of values quantifying an event in a computer network. The machine-readable instructions 504 may cause the processor to determine an error associated with the distribution. The machine-readable instructions 506 may cause the processor to compare the error to a threshold error value. The machine-readable instructions 508 may cause the processor to responsive to a determination that the error does not exceed the threshold error value, generate an expected maximum based on a mean of the plurality of values and a second highest value in the plurality of values.

In some examples, the error may include a standard deviation of the distribution of values and the threshold error value may include a predefined threshold standard deviation. In other examples, the error may include a difference between the actual maximum value in the distribution of values and the second highest value in the distribution of values, where the threshold error value may include a threshold difference. In either of the examples, if the error is larger than the threshold error value, the processor may determine an alternative way to estimate the expected maximum.

The machine-readable instructions 510 may cause the processor to detect an anomalous event in the computer network based on the expected maximum. In some examples, responsive to a determination that the error exceeds the threshold error value, the instructions may further cause the processor to generate the expected maximum based on a second technique different from the mean of the plurality of values and the second highest value. The second technique may include one or more of the techniques described with respect to FIG. 3. In some examples, each value of the plurality of values quantifies an event of an event type in the computer network. In these examples, to detect the anomalous event, the instructions may further cause the processor to access a first value (such as number of logins within a predefined amount of time) quantifying a first event of the event type in the computer network and compare the first value and the expected maximum, wherein the anomalous event is detected based on the comparison of the first value and the expected maximum.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory machine-readable medium on which is stored instructions that when executed by the processor, cause the processor to:
   access a distribution of a plurality of values, each value of the plurality of values quantifying an event of an event type in a computer network;
   determine a mean of the plurality of values and a second highest value of the plurality of values;
   generate an expected maximum of the distribution based on the mean and the second highest value;
   access a first value quantifying a first event of the event type in the computer network;
   determine that the first event is an anomalous event based on the first value and the expected maximum of the distribution; and
   in response to the determination that the first event is an anomalous event, cause a change to occur in the computer network.

2. The apparatus of claim 1, wherein to generate the expected maximum, the instructions further cause the processor to:
   sum the mean and the second highest value.

3. The apparatus of claim 1, wherein the instructions further cause the processor to:
   access a new distribution of a new plurality of values, each new value of the new plurality of values quantifying the event of the event type in the computer network;
   determine a new mean of the new plurality of values and a new second highest value of the new plurality of values;
   generate a new expected maximum of the new distribution based on the new mean and the new second highest value;
   determine that the new expected maximum is invalid; and
   disregard the new expected maximum.

4. The apparatus of claim 3, wherein to determine that the new expected maximum is invalid, the instructions further cause the processor to:
   determine an error associated with the new expected maximum;
   compare the error to a threshold error value; and
   determine that the new expected maximum is invalid based on the comparison of the error to a threshold error value.

5. The apparatus of claim 1, wherein the instructions further cause the processor to:
   access information indicating whether or not the first event was correctly determined to be an anomalous event; and
   adjust the expected maximum based on the accessed information.

6. The apparatus of claim 5, wherein to adjust the expected maximum, the instructions cause the processor to:
   apply a machine-learning model based on the accessed information indicating whether or not the first event was correctly determined to be an anomalous event;
   adjust the expected maximum up or down based on the machine-learning model.

7. The apparatus of claim 6, wherein to adjust the expected maximum, the instructions cause the processor to:
   correlate the mean in the distribution to the accessed information indicating whether or not the first event was correctly determined to be an anomalous event; and
   apply a weight to the mean to adjust the expected maximum.

8. The apparatus of claim 6, wherein to adjust the expected maximum, the instructions cause the processor to:
   correlate observed second highest value in the distribution to actual detected outcomes; and
   apply a weight to the second highest value to adjust the expected maximum.

9. The apparatus of claim 1, wherein the distribution of the plurality of values is specific to a particular user and the expected maximum is applied only to the particular user.

10. The apparatus of claim 1, wherein the distribution of the plurality of values relates to a plurality of users and the expected maximum is applied to any user among the plurality of users.

11. The apparatus of claim 1, wherein the event type relates to a number or duration of the event.

12. A method, comprising:
    accessing, by a processor, a distribution of a plurality of values;
    determining, by the processor, a mean of the plurality of values and a second highest value of the plurality of values;
    generating, by the processor, an expected maximum of the distribution based on the mean and the second highest value;
    determining, by the processor, an anomaly threshold based on the expected maximum of the distribution;
    determining, by the processor, that an anomalous event has occurred based on the anomaly threshold; and
    causing, by the processor, a mitigative action to be performed responsive to the anomalous event.

13. The method of claim 12, wherein determining that the anomalous event has occurred comprises determining one or more of: determining a potential security event in a computer network, determining an abnormal health condition based on diagnostic test results, predicting a potential component failure, determining potential fraud, or predicting potential traffic congestion.

14. The method of claim 12, wherein generating the expected maximum comprises:
    summing the mean and the second highest value, and wherein determining the anomaly threshold comprises using the expected maximum for the anomaly threshold.

15. The method of claim 12, wherein generating the expected maximum comprises:
    summing the mean and the second highest value, and wherein determining the anomaly threshold comprises applying a weight to the expected maximum and using the weighted expected maximum as the anomaly threshold.

16. The method of claim 12, further comprising:
    receiving, via a user interface, feedback indicating whether or not the anomalous event has been flagged as an event of concern; and
    adjusting the expected maximum based on the feedback.

17. A non-transitory machine-readable medium on which is stored machine-readable instructions that when executed by a processor, cause the processor to:
    access a distribution of a plurality of values, each value of the plurality of values quantifying an event in a computer network;

determine an error associated with the distribution;
compare the error to a threshold error value;
responsive to a determination that the error does not exceed the threshold error value, generate an expected maximum based on a mean of the plurality of values and a second highest value in the plurality of values; and
detect an anomalous event in the computer network based on the expected maximum based on the mean of the plurality of values and the second highest value in the plurality of values.

18. The non-transitory machine-readable medium of claim 17, wherein responsive to a determination that the error exceeds the threshold error value, the instructions when executed further cause the processor to:
generate the expected maximum based on a second technique different from the mean of the plurality of values and the second highest value.

19. The non-transitory machine-readable medium of claim 17, wherein each value of the plurality of values quantifies an event of an event type in the computer network, and wherein to detect the anomalous event, the instructions when executed further cause the processor to:
access a first value quantifying a first event of the event type in the computer network; and
compare the first value and the expected maximum, wherein the anomalous event is detected based on the comparison of the first value and the expected maximum.

20. The non-transitory machine-readable medium of claim 17, wherein the expected maximum is based on a sum of the mean and the second highest value.

* * * * *